United States Patent
Zafiris et al.

(10) Patent No.: US 9,403,340 B2
(45) Date of Patent: Aug. 2, 2016

(54) METHOD OF MANUFACTURING A COMPOSITE LOAD-BEARING STRUCTURE

(71) Applicant: Hamilton Sundstrand Corporation, Windsor Locks, CT (US)

(72) Inventors: Georgios S. Zafiris, Glastonbury, CT (US); Mark R. Gurvich, Middletown, CT (US); John P. Wesson, West Hartford, CT (US); Gopal R. Krishnan, Wethersfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 37 days.

(21) Appl. No.: 14/060,912

(22) Filed: Oct. 23, 2013

(65) Prior Publication Data

US 2014/0120317 A1    May 1, 2014

Related U.S. Application Data

(60) Provisional application No. 61/718,365, filed on Oct. 25, 2012.

(51) Int. Cl.
| | |
|---|---|
| *B29C 44/32* | (2006.01) |
| *B29C 70/08* | (2006.01) |
| *B32B 37/15* | (2006.01) |
| *B32B 3/28* | (2006.01) |
| *B29D 99/00* | (2010.01) |
| *B32B 5/18* | (2006.01) |
| *B29C 70/50* | (2006.01) |
| *B32B 5/24* | (2006.01) |
| *B29C 53/28* | (2006.01) |

(52) U.S. Cl.
CPC . *B32B 3/28* (2013.01); *B29C 44/32* (2013.01); *B29C 70/086* (2013.01); *B29C 70/504* (2013.01); *B29D 99/001* (2013.01); *B29D 99/0021* (2013.01); *B32B 5/18* (2013.01); *B32B 5/245* (2013.01); *B32B 37/153* (2013.01); *B29C 53/285* (2013.01); *B32B 2260/021* (2013.01); *B32B 2260/046* (2013.01); *B32B 2262/101* (2013.01); *B32B 2262/106* (2013.01); *B32B 2266/0278* (2013.01); *B32B 2305/022* (2013.01); *B32B 2307/558* (2013.01); *B32B 2307/72* (2013.01); *Y10T 156/1043* (2015.01); *Y10T 428/24512* (2015.01)

(58) Field of Classification Search
USPC .......................................... 156/79, 213, 221
See application file for complete search history.

(56) References Cited

U.S. PATENT DOCUMENTS

| | | | |
|---|---|---|---|
| 38,056 A | 3/1863 | Mosher | |
| 3,246,058 A * | 4/1966 | Voelker | 264/46.2 |
| 3,526,556 A * | 9/1970 | Berner | 156/79 |
| 5,288,538 A * | 2/1994 | Spears | 428/116 |
| 5,349,749 A * | 9/1994 | Fiedler | 29/897 |
| 5,434,226 A * | 7/1995 | Nguyen et al. | 525/534 |
| 5,542,626 A * | 8/1996 | Beuck et al. | 244/107 |
| 5,645,184 A * | 7/1997 | Rowse et al. | 220/1.5 |
| 6,324,812 B1 | 12/2001 | Drya-Lisiecka | |
| 7,074,027 B2 | 7/2006 | Starita | |

* cited by examiner

*Primary Examiner* — Barbara J Musser
(74) *Attorney, Agent, or Firm* — Carlson, Gaskey & Olds, PC

(57) ABSTRACT

A method of forming a composite structure including passing a web that is impregnated with an uncured resin in an assembly direction. Foam is forced about opposed sides of the web with the web including corrugations at least after this step. Outer skins of a fiber mat are attached onto outer sides of the web and foam. The fiber mat is impregnated with a resin. The combination of the fiber mats, the foam and the web is thermoformed in a mold to provide a shape for a structure.

15 Claims, 3 Drawing Sheets

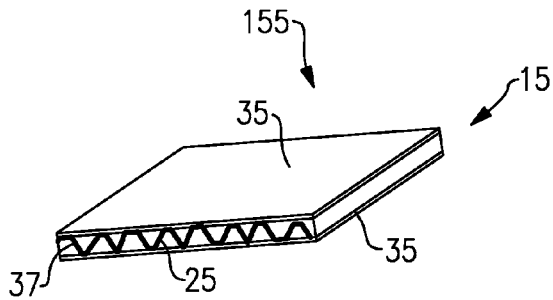
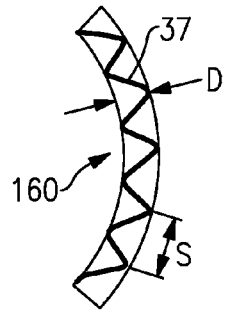
FIG.2A  FIG.2B
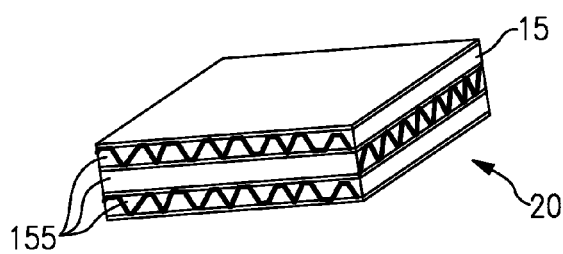
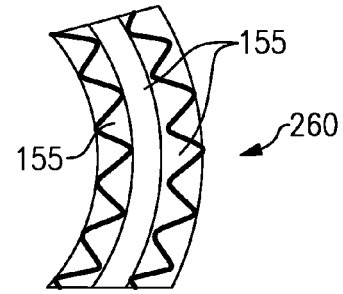
FIG.3A  FIG.3B
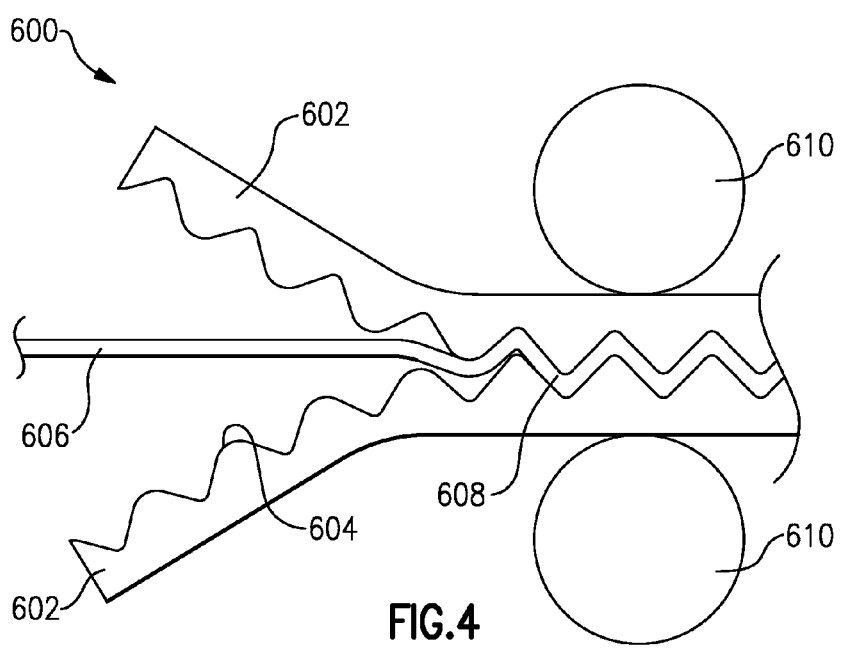
FIG.4

METHOD OF MANUFACTURING A COMPOSITE LOAD-BEARING STRUCTURE

CROSS-REFERENCE TO RELATED APPLICATION

This application claims priority to U.S. Provisional Application No. 61/718,365, which was filed Oct. 25, 2012.

BACKGROUND OF THE INVENTION

This application relates to a method of making a composite structure and structures made by the method.

Current designs of many structural components require load-bearing panels. These may be formed of composites or metal.

In composite manufacture, such elements may be used as beam elements.

The current methods for manufacturing such components involve multiple labor intensive processes and steps. This can result in relatively high manufacturing costs. In addition, the distinct method steps can often result in a variation across several parts.

SUMMARY OF THE INVENTION

A method of forming a composite structure includes passing a web that is impregnated with an uncured resin in an assembly direction. Foam is forced about opposed sides of the web with the web including corrugations at least after this step. Outer skins of a fiber mat are attached onto outer sides of the web and foam. The fiber mat is impregnated with a resin. The combination of the fiber mats, the foam and the web is thermoformed in a mold to provide a shape for a structure.

These and other features may be best understood from the following drawings and specification.

BRIEF DESCRIPTION OF THE DRAWINGS

FIG. 2A shows a first intermediate manufactured structure.
FIG. 2B shows the final manufactured structure.
FIG. 3A shows an alternative intermediate structure.
FIG. 3B shows the alternative final structure.
FIG. 4 shows an alternative method.

DETAILED DESCRIPTION

Figure 1:
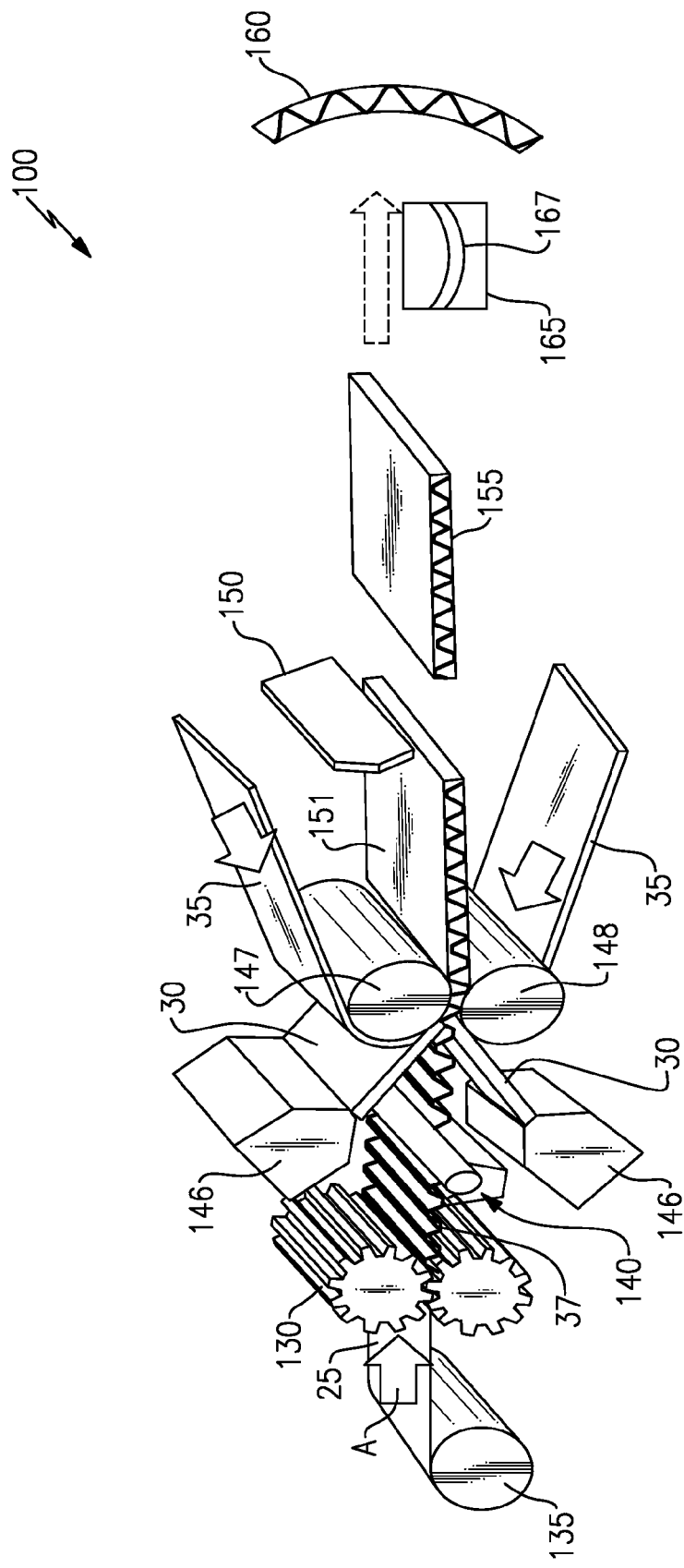
FIG. 1 shows a manufacturing process.

As shown in FIG. 1, a manufacturing process 100 starts with a web of material 25 from a roller 135. The web of material may be a felt or mat. Corrugation rollers 130 form corrugations 37 in the web. As shown, the corrugated web 25 is passed through a vat 140 which may be filled with a resin to impregnate the web 25.

Extrusion dies 146 extrude foam 30, which is forced onto sides of the corrugations 37 by rollers 147 and 148. In addition, outer skins 35 are formed onto a composite panel at 151. Rollers 147 and 148 urge the foam cores 30 to fill the corrugation 37 and simultaneously urge the skins 35 to cover the corrugations 37 and the foam core 30.

The skins 35 are formed of a fiber felt or mat and may be impregnated with a resin. Generically, the material of the skins may be called a mat, even if formed of felt. A cutting tool 150 cuts sections 155 of an intermediate product.

From roller 135 to cutting tool 150, the material moves along an assembly direction A.

The sections 155 may be then placed in a thermoforming mold 165 and formed to a shape as shown at 167. In the thermoforming step 165, the impregnated resins in the web 25 and skins 35 are thermoset all in a single step. In addition, as shown at 160, a final shaped structure is achieved. As will be understood, appropriate motors are provided to drive rollers 135, 130, 147 and 148.

The structure 160 may have any number of applications, however, in one anticipated application, it will have use in the aerospace industry. As an example, material may be shaped to form nacelles, nacelle components, fuselage panels and structural components, turbine blades, propellers, other airfoils, or any number of other structures where high-load bearing and/or impact resistant performance is needed at reduced weight, with the latter requirement not being a limiting case for the disclosed applications and structures.

FIG. 2A shows a first intermediate product 155 having the skins 35, the corrugations 37 and the core foam 30. The final structure 160 is shown at FIG. 2B.

FIG. 3A shows an alternative 20 wherein there are three stacked layers of the intermediate product 155. Again, as shown in FIG. 3B, those three stacked layers are formed into a final structure 260.

The web 25 may be a polymer, carbon, fiberglass, quartz, or aramid-fiber composite or combinations of those several materials. The web 25 and its corrugation form a load distribution and bearing element in the final structure 160 or 260.

The foam 30 may be a low density polymer foam, such as a thermoplastic polymer foam, including polyetherimide (PEI) foam, polyphenylsulfone (PPSU) foam, polysulfone (PSU) foam, polyether ether ketone (PEEK) foam, and polyethersulfone (PES) foam, among others. The foam may have the density ranging from 500-10 kg/m$^3$. The foams can be unfilled or filled with a carbon or glass fibers.

FIG. 4 shows an alternative method embodiment 600, shown schematically. In embodiment 600, the foam layers 602 are formed with undulations 604. The web 606 is shown advancing to an assembly location without any corrugations yet having been formed. When the rollers 610 force the foam layers 602 against the web 606, the undulations 604 form the corrugations 608 in the web 606.

While FIGS. 1 and 4 both show rollers forcing the web and foam layers together, other ways of assembling the layers together may be used. Generically, the layers simply need to be positioned relative to each other.

The foam layers 602 may be preformed into the shape, and may be a thermoplastic or a thermoset polymer foam. Thermoset polymer foams include structural polyurethane foams, and may have densities ranging from 200-500 kg/mg$^3$.

The web 606 may be impregnated with additional resin, as an adhesive, to secure the layers, and may be assembled in a vacuum bag or mandrel. A worker of ordinary skill in this art would recognize various alternatives given the disclosure of this application.

The skin 35 may be formed of a carbon fiber or organic fiber or fiberglass felt or mat. The skins 35 provide outer mechanical support to the final structures 160, 260.

The web 25 and skins 35 will be impregnated by a polymer resin and, in one disclosed embodiment, a thermoset polymer. Upon curing in the thermoforming stage, the web 25, skin 35 and foam core 30 are all bonded together.

Any number of polymer thermosetting resins can be utilized, including epoxies, phenolics, BMI (bismaleimides) and cyanates.

While the thermoforming step 165 is disclosed as fully curing the structure 160 or 260, partial curing may also be performed. A final curing or post-curing stage can then be used to complete the manufacture. A sequential partial cure followed by a final cure may be beneficial to control thermal or mechanical stresses in the structure.

A height D or thickness across the material may be controlled as may be a spacing S between corrugations 37. These variables can be controlled to achieve desirable characteristics for the final structure 160 and 260.

The depth of the corrugation or thickness of the component D and a peak to peak distance S may be targeted for mechanical demands and can be selectively tuned to desired values, designed and optimized to the targeted final product.

The depth D and a profile of the web 25 can be tuned along a machine direction or a cross-direction of the web. If a machine-direction profiling is used, several full width corrugated pre-impregnated sheets may be laid into the thermoforming mold (such as shown in FIG. 3A) to form a desired element.

Figure 5A:
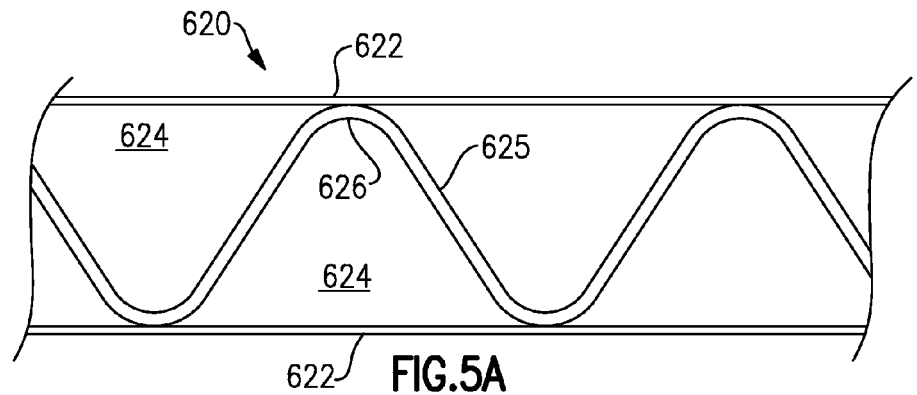
FIG. 5A shows one embodiment shape.
Figure 5B:
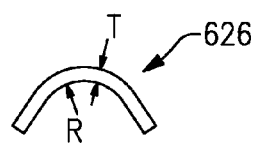
FIG. 5B shows a detail of the FIG. 5A embodiment.

FIG. 5A shows an assembly 620 with a first curved shape 626 to the corrugations in the web 625. Again, outer skins 622 are placed outwardly of the foam layers 624. Applicant has recognized that avoiding tight bends in the corrugations 626 is an advantage in controlling stresses in the final product. Thus, as shown in FIG. 5B, a shortest inside radius of curvature R of the corrugation curve 626 is defined, along with a maximum thickness T in the curved section. In embodiments, a ratio of R/T is greater than or equal to 1.0. More preferably, the ratio of R/T is greater than or equal to 3.0.

Figure 6A:
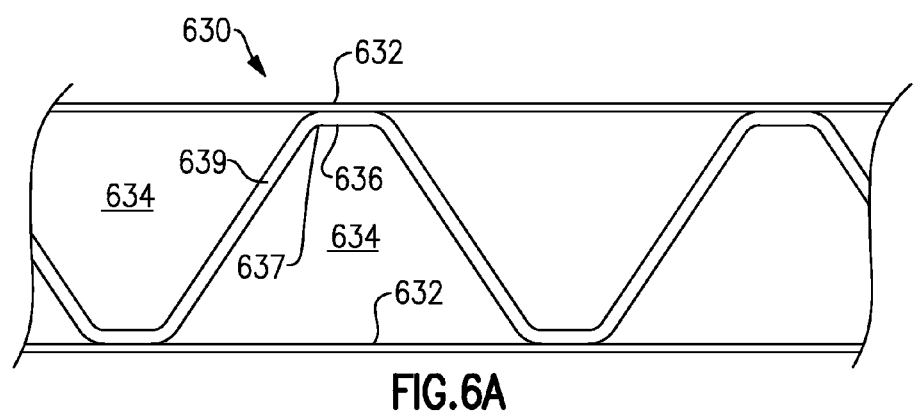
FIG. 6A shows another embodiment shape.

FIG. 6A shows another shape embodiment 630 wherein the corrugation 636 has more of a trapezoidal shape. The corrugation 636 has a flat surface contacting the skin 632, then curved corners 637 merging back into the web at 639. Again, there is outer skin layer 632 and foam layer 634.

Figure 6B:
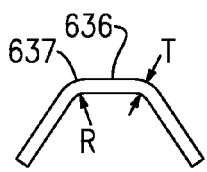
FIG. 6B shows a detail of the FIG. 6A shape.

As shown in FIG. 6B, the radius of curvature R of the corners 637 of the trapezoidal shape is again defined as the shortest inside radius of that curve. The ratios of R to T as defined above, hold true of this embodiment also.

Although an example method and product are disclosed, a worker of ordinary skill in this art would recognize that certain modifications would come within the scope of this invention. For that reason, the following claims should be studied to determine the true scope and content of this invention.

The invention claimed is:

1. A method of forming a composite structure comprising the steps of:
   a) impregnating a web with an uncured resin and passing the web in an assembly direction, said web being formed of at least one of a polymer, carbon, fiberglass, quartz, or aramid-fiber composite;
   b) extruding foam and then positioning the foam about opposed sides of said web with the web including corrugations at least after step b);
   c) attaching outer skins of a fiber mat onto outer sides of said web and said foam, with said fiber mat being impregnated with a resin, and said fiber mat being at least one of a carbon fiber, organic fiber, or fiberglass felt; and
   d) thermoforming the combination of said fiber mats, said foam and said web to cure the resin in a mold to provide a shape for a formed structure.

2. The method as set forth in claim 1, wherein said web is formed from a spool of material and corrugations are formed in said web by corrugation rollers upstream of a location where said foam is positioned about said corrugations, and prior to step b).

3. The method as set forth in claim 2, wherein said web passes through a resin to become impregnated.

4. The method as set forth in claim 1, wherein said foam is formed with undulations that form corrugations in the web at step b).

5. The method as set forth in claim 1, wherein intermediate panels are cut from an assembly including said fiber mats, said foam and said web, and said panels are inserted into said mold for said thermoforming step.

6. The method as set forth in claim 5, wherein a plurality of layers of said panel are inserted into said mold to form said structure with a plurality of layers.

7. The method as set forth in claim 5, wherein said foam is extruded from an extrusion die and then positioned by said rollers about said web.

8. The method as set forth in claim 1, wherein said foam is extruded from an extrusion die and then positioned by rollers about said web.

9. The method as set forth in claim 8, wherein said rollers also positioning said fiber mat outwardly of said foam as said foam is positioned about said web.

10. The method as set forth in claim 9, wherein said corrugations are formed in said web by undulations in said foam.

11. The method as set forth in claim 9, wherein corrugations are formed in said web by rollers at a location upstream of a location where the foam is positioned about the web.

12. The method as set forth in claim 1, wherein said formed structure is an aerospace component.

13. The method as set forth in claim 12, wherein said formed structure is one of a nacelle, a nacelle component, a fuselage panel, and a component including an airfoil.

14. The method as set forth in claim 13, wherein said component includes said airfoil.

15. The method as set forth in claim 14, wherein said component is one of a turbine blade and a propeller.

* * * * *